C. J. BEST.
MOTOR GENERATOR SET.
APPLICATION FILED APR. 2, 1913.
1,208,730.
Patented Dec. 19, 1916.
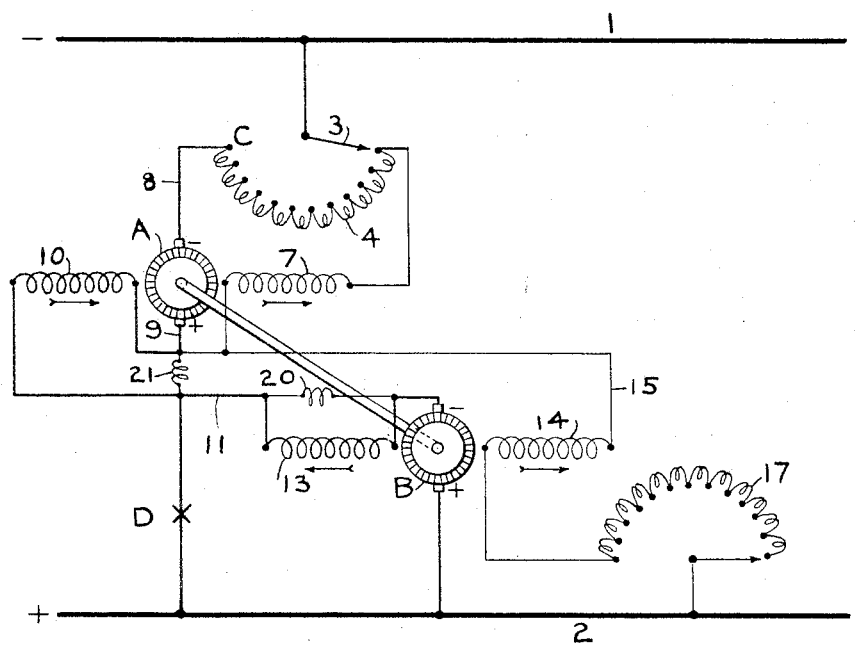
WITNESSES:
R. G. Allen.
F. E. Aul.
INVENTOR.
Charles J. Best,
By Owen & Owen.
His attys.

UNITED STATES PATENT OFFICE.

CHARLES J. BEST, OF DELPHOS, OHIO.

MOTOR-GENERATOR SET.

1,208,730.

Specification of Letters Patent.

Patented Dec. 19, 1916.

Application filed April 2, 1913. Serial No. 758,424.

*To all whom it may concern:*

Be it known that I, CHARLES J. BEST, a citizen of the United States, and a resident of Delphos, in the county of Allen and State of Ohio, have invented a certain new and useful Motor-Generator Set; and I do hereby declare the following to be a full, clear, and exact description of the invention, such as will enable others skilled in the art to which it appertains to make and use the same, reference being had to the accompanying drawings and to the characters of reference marked thereon, which form a part of this specification.

This invention relates to motor generator sets and particularly to motor generator sets that are adapted for use in connection with moving pictures apparatus and spot lights used in the theatrical business.

The object of my invention is the provision of a motor generator set that will automatically regulate the electric current.

A further object of the invention is to provide a motor generator set which will prevent a blow-out or other damage from a current upon a prolonged or permanent short circuit of a translating device such as an arc lamp, thus insuring the translating device and apparatus used in connection therewith against injury due to the carelessness or lack of skill of the operator.

The invention is fully described in the following specification, while in its broader aspect, it is capable of embodiment in numerous forms, a preferred embodiment thereof is illustrated diagrammatically in the accompanying drawing.

The figure illustrates the diagram of connections of the parts of the motor generator set and its connections with an arc lamp and a source of current supply.

In the drawing, A designates a motor, B the generator, and C the starting box for the motor. The rotors of the said motor and generator are connected mechanically together. Preferably they are connected to a common shaft. Both the motor and generator have compounded field windings. The motor field is cumulatively wound while the generator field is differentially wound. The motor and generator are of the multipolar type, four poles being preferably employed.

The set is connected to the source of direct current through the line wires 1 and 2. The line wire 1 is connected to the starting lever or switch 3 and the line wire 2 is connected to the generator B, and to the arc lamp or translating device D. The resistance 4 of the starting box is connected at its starting end to the shunt field 7 of the motor A. Line 8 from the opposite end of the resistance 4 connects with the negative side of the motor armature. The positive side of the motor armature connects through the wire 9 with the series winding 10 of the motor field. The shunt field winding 7 of the motor A is connected to the positive brush of the motor. The motor series winding 10 is connected through the line 11 to the series field winding 13 of the generator B and to the translating device D.

The generator positive brush is connected to the positive main line 2. The generator B is also provided with a differential shunt field 14, one end of which is connected through a wire 15 to the positive brush of the motor, and the winding 7, while the other end is connected to a rheostat 17. The rheostat is connected to the positive brush of the generator B, that is, to the positive main line 2.

To secure proper regulative effect of the series coils 10 and 13 of the motor A and the generator B, shunts 20 and 21 are preferably connected across the series field coils, as shown.

The operation of the apparatus is as follows: The circuit is closed by the operation of the switch arm 3 and the rotors are brought up to the proper speed. The set will then regulate the current through the electrodes of the arc light or translating device D. The rheostat 17 may be used to regulate the current through the shunt field 14 of the generator B. If the electrodes of the arc lamp D are closed together so that the resistance between the electrodes is reduced to zero, or if they are short circuited the motor will increase in speed, for when the generator B is short circuited the excess of current produced by the short circuit flows through the series field winding which is in differential with the shunt field of the generator. This causes a reduction in the magnetic flux through the pole pieces which will reduce the current through the electrodes or translating device D approximately to zero.

The generator set may be designed to meet the various conditions found in different electrode supplying systems and according to the character of the arc lamps or translating devices that may be used in connection therewith.

The motor and generator when combined in the manner described had equalizing action so that when a short circuit occurred at the translating device the current is reduced to zero. Short circuiting of the translating device causes the motor to increase in speed.

I wish it understood that my invention is not limited to any particular arrangement or construction of the parts or the manner of wiring.

Having thus described my invention, what I claim as new, and desire to secure by Letters Patent, is as follows:—

1. In combination with a translating device, a motor generator set for regulating the current to said translating device, the motor of the set having a series field winding and a shunt field winding, the two windings wound cumulatively, the generator of the set having a series field winding and a shunt field winding, the two windings of the generator wound differentially, the shunt field winding of the generator being connected in series with a divided circuit comprising the shunt field winding of the motor and the armature of the motor in parallel and the series field winding of the motor being connected in series with the translating device.

2. In combination with a source of current supply and a translating device, a motor generator set for regulating the current to said translating device, the motor of the set having a series field winding and a shunt field winding, the two windings wound cumulatively, the generator of the set having a series field winding and a shunt field winding, the two windings of the generator wound differentially, the shunt field winding of the generator being connected in series with a divided circuit comprising the shunt field winding of the motor and the armature of the motor in parallel and the series field winding of the motor being connected in series with the translating device, a resistance connecting one terminal of the shunt field of the motor with the motor armature and means for making connection with the resistance at points intermediate the terminals thereof, with the source of current supply.

In testimony whereof, I have hereunto signed my name to this specification in the presence of two subscribing witnesses.

CHARLES J. BEST.

Witnesses:
 C. W. OWEN,
 S. T. KLOTZ.